US011649047B2

(12) United States Patent
Stukas

(10) Patent No.: US 11,649,047 B2
(45) Date of Patent: May 16, 2023

(54) VERTICAL TAKE-OFF OR LANDING (VTOL) AERIAL DEVICE

(71) Applicant: Kaylee Stukas, Charlotte, NC (US)

(72) Inventor: Kaylee Stukas, Charlotte, NC (US)

( * ) Notice: Subject to any disclaimer, the term of this patent is extended or adjusted under 35 U.S.C. 154(b) by 64 days.

(21) Appl. No.: 17/222,344

(22) Filed: Apr. 5, 2021

(65) Prior Publication Data
US 2021/0316848 A1    Oct. 14, 2021

Related U.S. Application Data

(60) Provisional application No. 63/007,630, filed on Apr. 9, 2020.

(51) Int. Cl.
*B64C 29/00*    (2006.01)

(52) U.S. Cl.
CPC ................. *B64C 29/0066* (2013.01)

(58) Field of Classification Search
CPC ............ B64C 29/0016; B64C 29/0025; B64C 29/0066
See application file for complete search history.

(56) References Cited

U.S. PATENT DOCUMENTS

| 3,375,998 | A | * | 4/1968 | Alvarez-Calderon | .... B64C 9/22 244/210 |
| 4,171,112 | A | * | 10/1979 | Harvey | .................. B64D 27/16 244/55 |
| 4,901,947 | A | * | 2/1990 | Raymer | ................ B64C 29/005 D12/326 |
| 5,115,996 | A | * | 5/1992 | Moller | ................ B64C 29/0025 D12/326 |
| 5,150,857 | A | | 9/1992 | Moffitt et al. | |
| 7,806,362 | B2 | | 10/2010 | Yoeli | |
| 7,857,253 | B2 | | 12/2010 | Yoeli | |
| 10,293,932 | B2 | | 5/2019 | Mzahrani | |
| 2003/0183723 | A1 | * | 10/2003 | Bevilaqua | .......... B64C 29/0066 244/12.5 |
| 2015/0225079 | A1 | | 8/2015 | Starck et al. | |
| 2020/0108920 | A1 | * | 4/2020 | Rivellini | ............... B64C 39/024 |

OTHER PUBLICATIONS

Fleye Kickstarter, "Fleye Could Be Your Personal Autonomous Robot Drone," Dec. 10, 2015.
Mike Chua, "Bladeless Drone is Impressive, But Not Quite Bladeless as it Says it is," Tech Culture and Lifestyle Stuff, < https://d2cdo4blch85n8.cloudfront.net/wp-content/uploads/2018/12/Bladeless-Drone-by-Stefano-Rivellini-image-1.jpg>, 2018.
Parisa Footohi, et al., "Aerodynamic Design of Long-Range VTOL UAV," https://doi.org/10.2514/6.2019-2291, published online Jan. 6, 2019.

* cited by examiner

*Primary Examiner* — Joshua J Michener
*Assistant Examiner* — Ashesh Dangol

(57) ABSTRACT

Disclosed is an aircraft having ducted fans inside ducts that are incorporated into an aircraft body design to configure an undercambered bottom. Two forward ducts intake above the body (creating lift) and expel air downward and slightly outward at the front of the craft. Two rear ducts also intake above the body, but expel air downwardly and outwardly at the rear of the craft. The overall volume and footprint for the craft enables use in existing parking and other environmental structures normally used to accommodate automobiles.

14 Claims, 9 Drawing Sheets

VERTICAL TAKE-OFF OR LANDING (VTOL) AERIAL DEVICE

RELATED APPLICATIONS

This application is a non-provisional and claims benefit of U.S. Patent Application Ser. No. 63/007,630, filed Apr. 9, 2020. The disclosure of which is incorporated by reference herein.

BACKGROUND

The disclosed embodiments relate to the field of aerial vehicles, more specifically vehicles capable of Vertical Takeoff and Landing (VTOL).

Numerous VTOL aerial vehicle concepts are known in the art. Some versions include multiple rotors (e.g. quadcopters, octocopters, etc.) which are constructed using externally-mounted rotors. Other VTOL aerial vehicle concepts have been created which utilize external rotors which are purported to provide human and goods transportation (e.g. drone delivery or air taxis). Other published concepts involve constructions using fans contained within the frame of the vehicle. One other known VTOL concept utilizes wings and a body, the body including a single ducted fan which receives air through a single common intake and then releases air through a plurality of divided ducts to create lift.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In embodiments, a VTOL aerial device includes a body and duct systems. Each duct system includes a fan and has an air intake. The air intakes open in a forward direction, and each of the duct systems expel downwardly. In embodiments, the ducts expel outwardly in addition to downwardly.

In yet other embodiments, the aerial device has first, second, third, and fourth ducts. Each of the first and second ducts can be configured to intake air from above the body, then have a reversed arrangement to expel air substantially downwardly and outwardly from the front of the craft. Each of the third and fourth ducts can be configured to receive air from above the body and expel air downwardly and outwardly at a substantially rearward portion of the aerial device. In further embodiments, at least two of the first, second, third, and fourth ducts are configured into a lift-creating profile underneath the body.

In further embodiments, the first, second, third, and fourth ducts terminate at outlets, where the first outlet is located on a front left hand side of the aerial device, the second outlet is located at a front right hand side of the aerial device, the third outlet is located at a rear left hand side of the aerial device, and the fourth outlet is located at a rear right hand side of the aerial device.

In embodiments, the aerial device includes a control system. The control system, in embodiments, is configured to create a roll-inducing thrust output differential between: (i) the first and third outlets; and (ii) the second and fourth outlets. In embodiments, the control system is configured to create a pitch-inducing thrust output differential between: (i) the first and second outlets; and (ii) the third and fourth outlets. In still further embodiments, the control system is configured to create a yaw-inducing thrust output differential between: (i) the first and fourth outlets; and (ii) the second and third outlets.

The aerial device, in versions, is configured (by the ducts) such that the craft has an overall 3-D volume meeting a plurality of automotive 3-D size requirements, and can also have an overall footprint similar to that of a conventional automobile.

In embodiments, an aerial device has a body configured to include a payload (which, in embodiments, can be a human payload).

The first and second ducted fans can include first and second reversing duct systems, respectively, each of the first and second duct systems being configured to receive air from a substantially forward direction and then expel air in a substantially downward direction; and third and fourth ducted fans included in third and fourth duct systems, each of the third and fourth duct systems being configured expel air in a substantially downward direction. Each of the first and second reversing duct systems can, in embodiments, include (i) a substantially-forward-facing intake opening leading a slightly-downwardly angled receiving section, then transitioning into (ii) a rear elbow section, the rear elbow section redirecting airflow from a substantially rearward direction to a substantially forward direction, rear elbow section then transitioning into (iii) a skewed expansion section, the skewed expansion section being expanded and then angled slightly upward, the skewed expansion section then transitioning into (iv) a continuing expansion section expanding slightly while substantially following the slightly upward direction imposed by the skewed section, the continuing expansion section then transitioning into (v) a forward elbow section, the forward elbow section redirecting the air from the slightly upward direction imposed by the continuing expansion section, and then directing the air substantially downward and slightly outward from the body of the aerial device. In embodiments, each of the third and fourth duct systems include: (i) a substantially-forward facing intake opening leading into a subtle elbow, the subtle elbow accepting air from the intake opening, and directing the air both downward and also outward from the rear of the aerial device.

In embodiments, the body is configured to create aerodynamic lift when traveling horizontally. In embodiments, each of the first, second, third, and fourth duct systems include intakes located above the body thus creating a pressure drop above the body when the ducted fans are operational. The pressure drop thus creates lift.

In embodiments, at least one of the first, second, third, or fourth duct systems are incorporated into an underside configuration for the aerial device wherein the at least a portion of the underside configuration comprises an undercambered floor creating lift for the aerial device. In yet further embodiments, each of the first and second duct systems are configured to facilitate the shape of the undercambered floor of the vehicle thus creating positive pressure underneath the aerial vehicle during forward motion creating lift. In versions, the first and second ducts are substantially symmetrical about a vertical plane taken along the length of the aerial device, and the third and fourth ducts are also substantially symmetrical about the vertical plane taken along the length of the aerial device.

In other embodiments, an aircraft includes a body configured to accommodate a human passenger; first and second ducted fan systems configured to intake air and expel the air downwardly and outwardly; third and fourth ducted fan systems configured to intake air and expel the air downwardly and outwardly; a control system on the aircraft, the control system configured to create: a roll-inducing thrust output differential between: (i) the first and third ducts; and (ii) the second and fourth ducts; a pitch-inducing thrust output differential between: (i) the first and second ducts; and (ii) the third and fourth ducts; and a yaw-inducing thrust output differential between: (i) the first and fourth ducts; and (ii) the second and third ducts.

BRIEF DESCRIPTION OF THE DRAWING FIGURES

Some embodiments of the present invention are illustrated as an example and are not limited by the figures of the accompanying drawings, in which like references may indicate similar elements and in which:

FIG. 9 depicts a partial side section view taken at Section 9-9 in FIG. 3 exposing the passenger compartment of the embodiment disclosed in FIG. 1; and.

Figure 1:
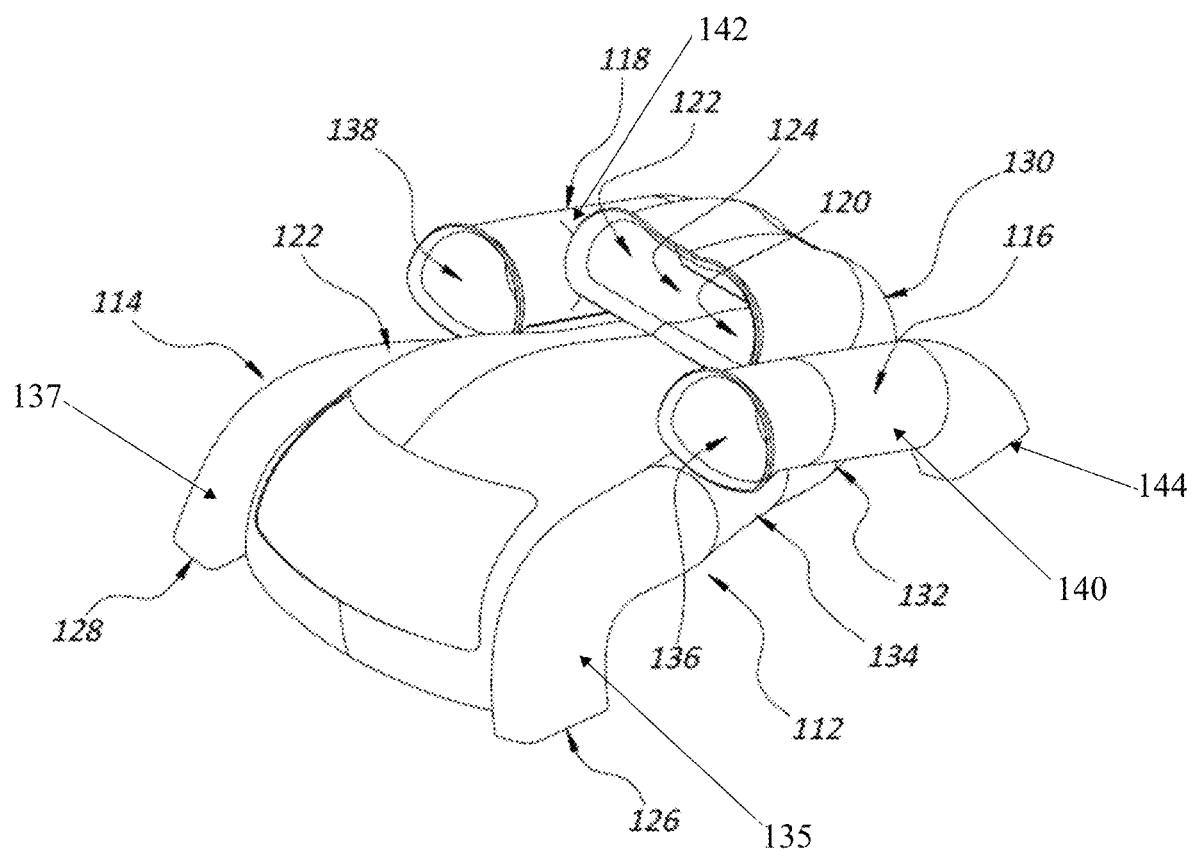
FIG. 1 depicts an isometric perspective view in an embodiment of the disclosed VTOL aerial vehicle.

The drawing figures do not limit the invention to the specific embodiments disclosed and described herein. The drawings are not necessarily to scale, emphasis instead being placed upon clearly illustrating the principles of the invention.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

At a high level, a novel VTOL aerial vehicle is disclosed in which multiple ducted fans provide lifting force, control authority, and propulsion force. Vehicle movement is controllable through the use of electronic mixing, a control system, as well as the physical layout and shape of the ductwork and bodywork in which the fans are contained. The ducted fans used to power and control the aerial vehicle (manned or unmanned) are configured into the frame of the vehicle using ductwork which overlaps along the length of the vehicle. The effect of this configuration is to reduce the overall size of the vehicle in a horizontal dimension (looking at the vehicle profile from a top view). The air from each of the ducted fans is expelled using outlet ducts which are curved such that thrust force is directed downward to create lift, and angled outward to, along with the cooperation of the other outlet ducts, provide a degree for control authority. Further, the inlet ductwork is shaped such that negative pressure created by the inlet side of the fan produces forward thrust, as well as negative pressure across the top of the body of the aerial vehicle, thus creating a "lifting body" and generating additional lift for greater efficiency during forward flight.

In embodiments, four independent ducted fans are utilized. Varying the speed of the ducted fans on opposite corners induces a yaw moment acting on the VTOL aerial vehicle, therefore providing control authority of the rotation about the vertical axis (yaw). The present invention comprises an electronic control system, Inertial Measurement Unit (IMU), and variable speed motor drives which control the ducted fans in such a way that creates lifting thrust, forward thrust, and control authority and stabilization in all 6 degrees of freedom.

It has been recognized in conventional VTOL aerial vehicles with multiple rotors (e.g. quadcopters, octocopters, etc.) present packaging and safety issues. For example, since the rotors must be physically mounted far enough apart so that they do not collide with one another, the horizontal footprint is fairly large, and incompatible with environments in which space is limited. Further, since the blades are exposed during operation physical contact with the rotors is possible, which can result in injury or death.

Existing concepts including body mounted rotors also face physical packaging challenges in order to prevent the rotors from coming in physical contact with one another or aerodynamically influencing adjacent rotors. In other words, the VTOL aerial vehicles must be physically large enough to spin a rotor of large enough swept diameter which can provide ample thrust for the given payload at a distance far enough away from adjacent rotors. This can make the physical size of these conceptual VTOL aerial vehicles excessively large. For manned VTOL aerial vehicle concepts, also known as "air taxis", this would require a takeoff or landing area significantly larger than what is needed for traditional ground transportation (i.e. much greater than a standard parking spot for an automobile).

Rotors differ from ducted fans in that they are not shrouded or otherwise contained within ductwork. By shrouding or ducting a fan, the fan's efficiency improves due to several factors; mainly the reduction or elimination of blade tip losses. Additionally, positive air velocity into an inlet duct of a ducted fan (i.e. forward travel) can improve the efficiency of the fan.

Thus, the embodiments disclosed herein involve a VTOL aerial vehicle having ducted fans that are integrated into an overall vehicle frame configuration. Thus, the fans and intakes can be mounted in close proximity to one another, with their ductwork overlapping when viewed from above, resulting in a smaller physical footprint. Further, the disclosed embodiments enable containment of the fans within the frame of the vehicle. This reduces the risk of physical contact with the spinning rotors improving the safety. Additionally, the inlet ducts have been configured such that air is drawn in from the direction of forward travel, during forward travel; therefore generating forward thrust and increasing the efficiency of the ducted fans thus aiding in the transportation of people and/or goods. Finally, the inlet ducts have been physically positioned on top of the airfoil shaped body of the VTOL aerial vehicle. This creates additional negative pressure across the top of the body during forward flight, creating additional lift using the lifting body principles, further aiding in the transportation of people and/or goods.

The present invention will now be described by referencing the appended figures representing preferred embodiments. FIG. 1 depicts an example of an airframe 100 including an airframe body 102, which in embodiments, can be configured to carry a payload (e.g., things or persons). The body 102 structurally supports internal ducted fans, 104, 106, 108, and 110 which provide thrust. The airframe 100 is comprised of contiguous ducting, which contains the fans 104, 106, 108, and 110. The ductwork is used to direct air downward providing lift by forced air to the vehicle, but the ducting systems are further configured to direct the air slightly outward from each forward corner of the body 102 via outlets 126 and 128, and even more outward at the rear corners of the body 102 via outlets 144 and 146.

The duct systems will now be discussed in detail. In the disclosed embodiment, each duct system (e.g., systems 112, 114, 116, and 118) is uniquely configured to not only impart forced air handling, but also redirect the air in ways that have been discovered to be aerodynamically useful. Structurally, ducted fans 104 and 106 are included in reversing front duct systems 112 and 114, respectively.

Each of the first and second duct systems 112 and 114 are configured to receive air from a substantially forward direction (the direction from which air is introduced when the vehicle is in forward motion), and then expel air in a substantially forward and downward direction relative to the body 102, as well as slightly outward relative to the center longitudinal axis of the craft.

In embodiments, each of the first and second reversing front duct systems 112 and 114 include: (i) a substantially-forward-facing intake opening (120 for system 112, 122 for system 114) both systems which draw from a common plenum 124, which is slightly-downwardly angled, then transitioning into (ii) a rear elbow section 130, the rear elbow section 130 redirecting airflow from a substantially rearward direction to a substantially forward direction, rear elbow section 130 then transitioning into (iii) a skewed expansion section 132, the skewed expansion section 132 being expanded in a forward direction, and then angled slightly upward. The skewed expansion section 132 then transitions into (iv) a continuing expansion section 134, which houses ducted fan 104; which expands slightly while substantially following the slightly upward direction imposed by the skewed section 132, the continuing expansion section 134 then transitioning into (v) a forward, downwardly-directing elbow section 135, the forward, downwardly-directing elbow section 135 redirecting the air from the slightly upward direction imposed by the continuing expansion section 134, and then directing the out of an outlet (126 for duct 112, 128 for duct 114) air substantially downward, and slightly forward and outward from the body of the aerial device.

Ducted fans (or sets of fans) 108 and 110 are each included in third and fourth duct systems 116 and 118, respectively. Each of the third and fourth duct systems 116 and 118 are configured to receive air from a substantially forward direction (thus producing a ram air effect when the craft is in forward motion, the most common traveling mode) and expel air in a substantially downward direction, and slightly rearward and outward relative to the center axis of the craft. Each of the third and fourth duct systems 116 and 118 include: (i) substantially-forward facing intake openings 136 and 138 leading into velocity stack sections 140 and 142. The velocity stack sections 140 and 142 accept air from the intake openings 136 and 138, and direct the air substantially downward, and also slightly outward and rearward relative to the center axis of the craft.

Figure 2:
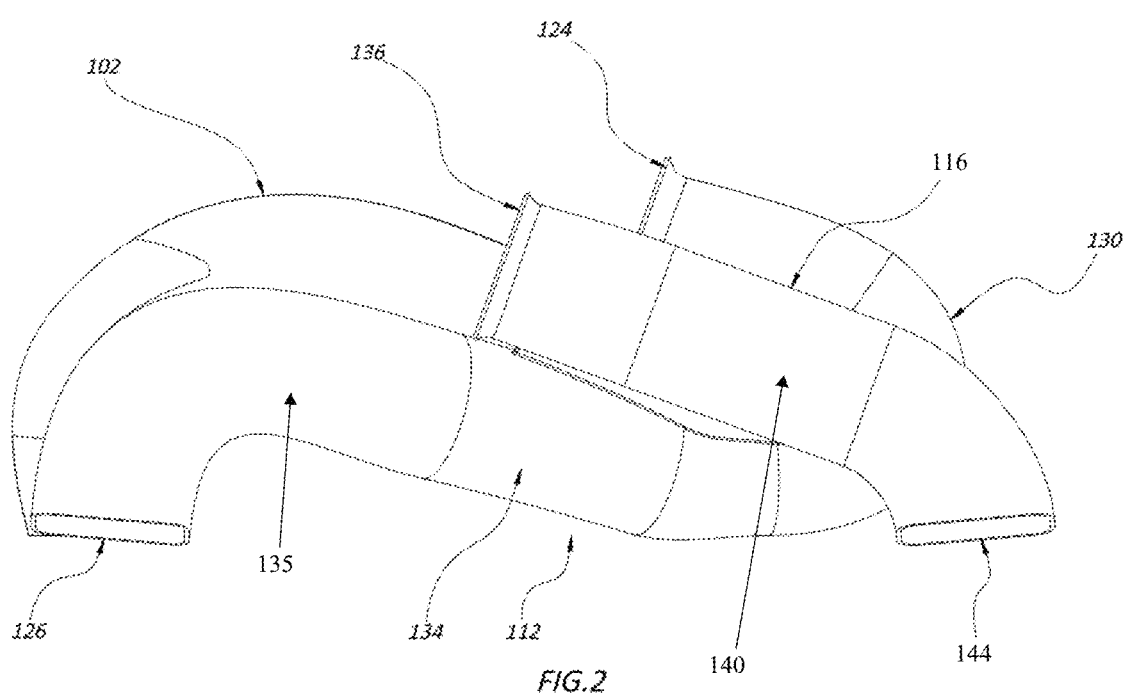
FIG. 2 depicts a side view of the embodiment disclosed in FIG. 1.

As shown in FIG. 2 another aspect regarding the locations of the duct intakes involves the creation of an upwardly compelling vacuum-induced lift. Ducts 116, 118, 120, and 122 each include openings which are oriented to draw air from a substantially forward and slightly upward direction through the duct inlets 124, 136, and 138 slightly towards the rear of the airframe 100 such that incoming air creates low pressure across the top of the airframe body 102. The low pressure area generated by both front duct inlet 124, and rear duct inlets 136 and 138 create lift described by Bernoulli's principle.

Front duct outlets 126 and 128, and rear duct outlets 144 and 146 divert the air exiting the front ductwork 112 and 114, and rear ductwork 116 and 118 respectively, in such a way that the air exiting the ductwork creates an upward vertical force acting on the airframe 100 for the purpose of achieving flight.

Varying the thrust exiting the front duct outlets 126 and 128 and rear duct outlets 144 and 146 independently of each other during flight creates a pitching moment (torque) around the center of lift of airframe 100, thus allowing for pitch (fore and aft) control authority of the vehicle during flight.

Figure 3:
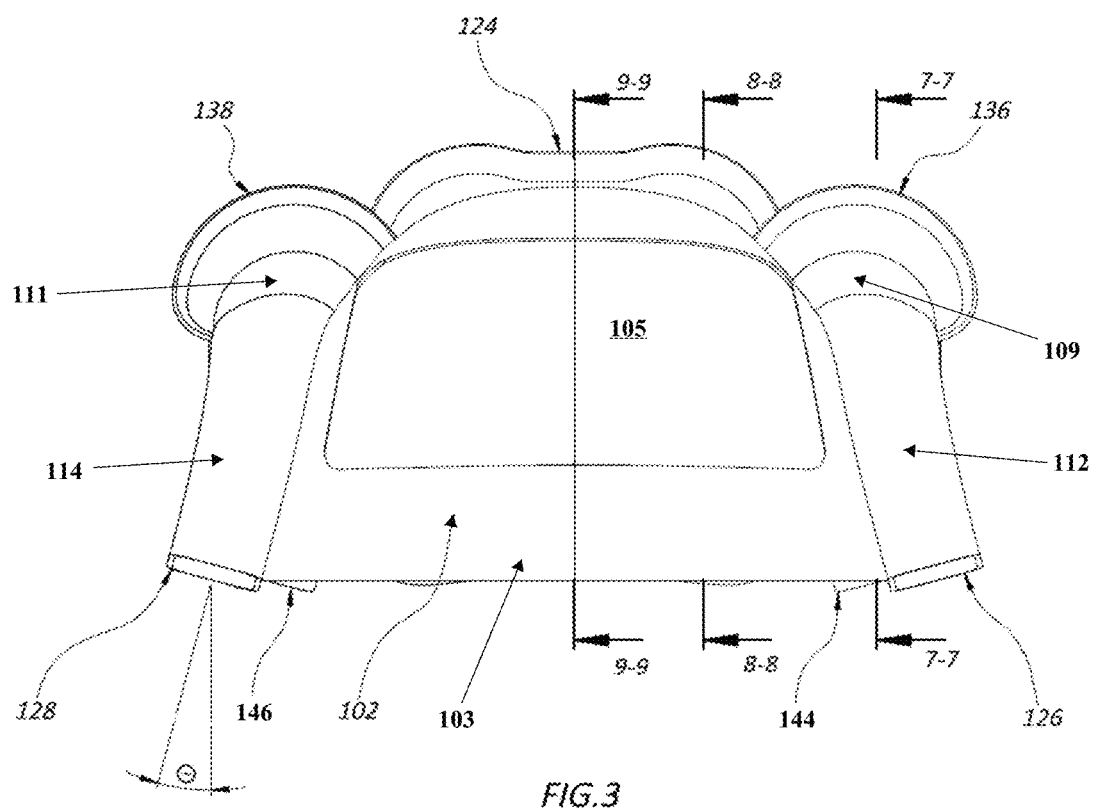
FIG. 3 depicts a front view of the embodiment disclosed in FIG. 1.

FIG. 3 depicts a front view showing a front portion 103 of the body 102 including a transparent portion 105 serving as a windshield. The upper portion of the body 102 partially occludes the intake plenum 124. Similarly, upper portions 109 and 111 of each of ducts 112 and 114 partially occlude the view of the rear duct intakes 136 and 138. The front duct outlets 126 and 128 can be seen and the rear duct outlets 144 and 146 are barely exposed. As described previously, air exiting the ductwork is diverted downward for lifting force. From the front perspective view, air is also diverted and directed outward at some degree 0 relative to vertical.

Figure 4:
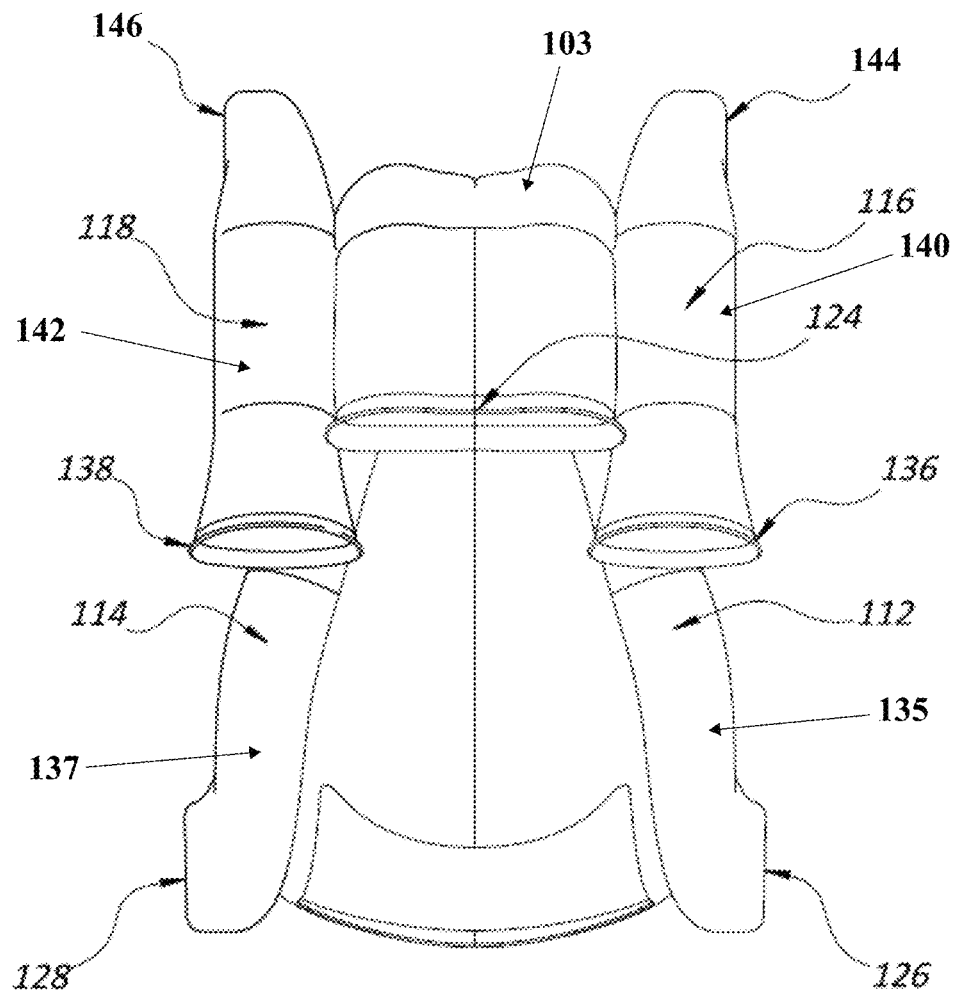
FIG. 4 depicts a top view of the embodiment disclosed in FIG. 1.

FIG. 4 depicts the top view of the airframe embodiment 100 comprised of front duct systems 112 and 114, front inlet plenum 124, left front duct outlet 126, right front duct outlet 128, rear duct systems 116 and 118, rear duct inlets 136 and 138, left rear duct outlet 146, right rear duct outlet 144. Rear duct systems 116 and 118 may overlap front duct systems 112 and 114 when viewed from above for the purposes of decreasing the physical size of the vehicle.

Varying the thrust exiting the left and right duct outlets independently of each other during flight creates a rolling moment (torque) around the center of lift of airframe 100, thus allowing for roll control authority of the vehicle during flight. For example, increasing thrust from left front duct outlet 126 and left rear duct outlet 144, and decreasing thrust from right front duct outlet 128 and right rear duct outlet 146 will result in the vehicle rolling to the right.

Thrust exiting the duct outlets generates a Y axis force component when viewed from above due to the duct outlets being angled outward at some degree $\Theta$. This can be described by the equation:

$$Fy = Ft(\sin \Theta)$$

Where: Ft=thrust force exiting the duct.

During normal steady state flight the Y force components described in the previous paragraph generated by the left duct outlets 126 and 144, and right side duct outlets 128 and 146, are equal and opposite and therefore cancel each other out.

Varying the thrust exiting duct outlets on opposite corners independently of each other during flight creates a yaw moment (torque) around the center of lift of airframe 100, thus allowing for yaw control authority of the vehicle during flight. E.g. increasing thrust from left front duct outlet 126 and right rear duct outlet 146, while decreasing thrust from right front duct outlet 128 and left rear duct outlet 144 results in the Y force components described above increasing from duct outlets 126 and 146, while the Y force components decrease from duct outlets 128 and 144. This will result in the vehicle yawing to the right and can be defined by the following equation:

$$Mz = 2Y[Ft1(\sin \Theta) - Ft2(\sin \Theta)]$$

Where:

Mz is the moment about the Z (vertical) axis

Y is the perpendicular distance from the outlet ducts to the center of lift

Ft1 is the thrust force from duct outlets 126 and 146

Ft2 is the thrust force from duct outlets 128 and 144

Figure 5:
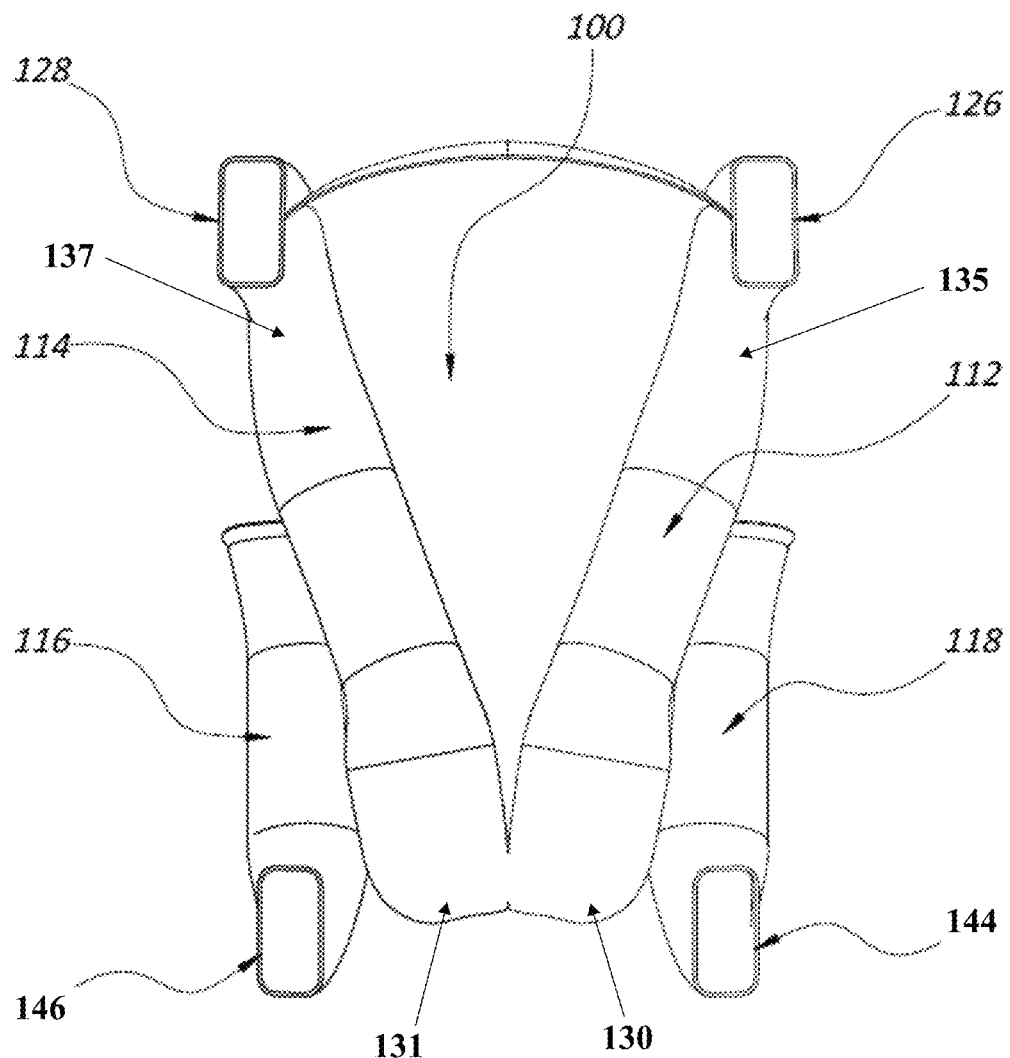
FIG. 5 depicts an bottom view of the embodiment disclosed in FIG. 1.

FIG. 5 depicts a bottom view of the airframe embodiment 100 comprised of front duct systems 112 and 114, left front duct outlet 126, right front duct outlet 128, rear duct systems 116 and 118, left rear duct outlet 144, right rear duct outlet 146. Rear duct systems 116 and 118 may overlap front duct systems 112 and 114 when viewed from above or below for the purposes of decreasing the physical size of the vehicle.

Also noteworthy is that the overall shape when viewed from above (see FIG. 4) or below (see FIG. 5) is that the overall shape is substantially rectangular (or, in other words, configured to fit within a substantially rectangular volumetric envelope), which is similar to the shape of land-based automobiles. This enables the device 100 to fit into rectangular spacing requirements. For example, conventional automobiles, which are in wide use, are often parked in spots designed to accommodate current vehicle shapes (e.g., parking lot stalls, garages). It should be additionally noted that the height of aerial device 100 (see FIG. 2) is also substantially within the range of heights currently adopted for automobiles thus enabling it to travel into or through height limiting structures (e.g., underneath bridges, vehicle garage entryways, etc.). The collective three-dimensional (3-D) volume that device 100 inhabits is substantially similar to that of many conventional automobiles, and within environmental size requirements. This enables aerial device 100 to utilize already-existing automotive structures and systems, meet regulatory requirements, and basically coexist amongst conventional automobiles without making environmental changes.

Figure 6:
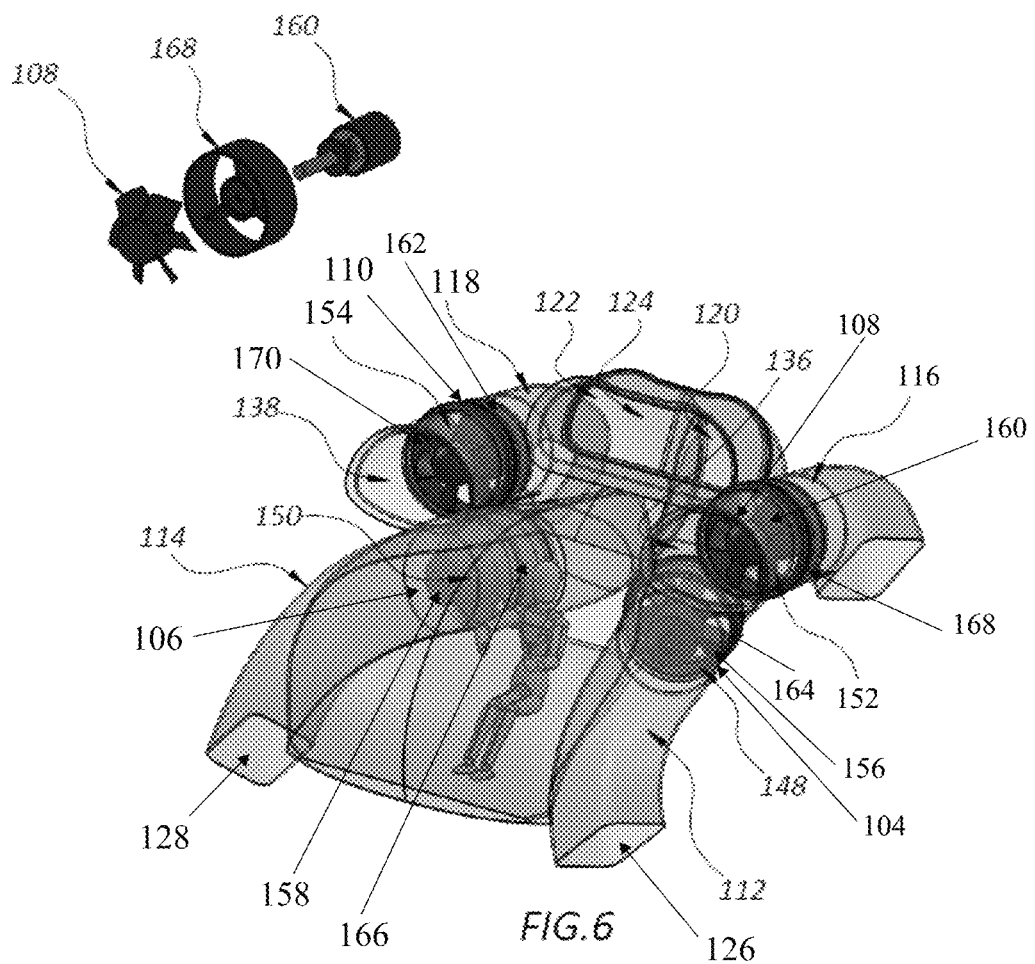
FIG. 6 shows the vehicle exterior ghosted thus revealing the engines utilized in the FIG. 1 embodiment.

Referring to FIG. 6, for the disclosed embodiment, the vehicle utilizes four fan assemblies 148, 150, 152, and 154, in each of ducts 112, 114, 116, and 118 respectively. Each assembly includes: electric motors 156, 158, 160, and 162, stators 164, 166, 168, and 170, and fans 104, 106, 108, and 110. Each of fan assemblies 148, 150, 152, and 154 is contained within ducts 112, 114, 116, and 118, respectively. The locations for all four fan assemblies are depicted in FIG. 6, which ghosts all but the motor assemblies. As can be seen, the fans of fan assemblies 152 and 154 direct the air rearwardly through each of ducts 116 and 118. The fans of fan assemblies 148 and 150 are located within the reversed ducts 112 and 114. Thus, the fans of these fan assemblies 148 and 150 draw air in through intakes 120 and 122 from plenum 124, and release air in a substantially downward direction from exhaust ports 126 and 128. It will be evident to those skilled in the art that the engines could be located in numerous different locations within each duct so long as they are oriented to direct air in the same flow direction in each duct.

Figure 7:
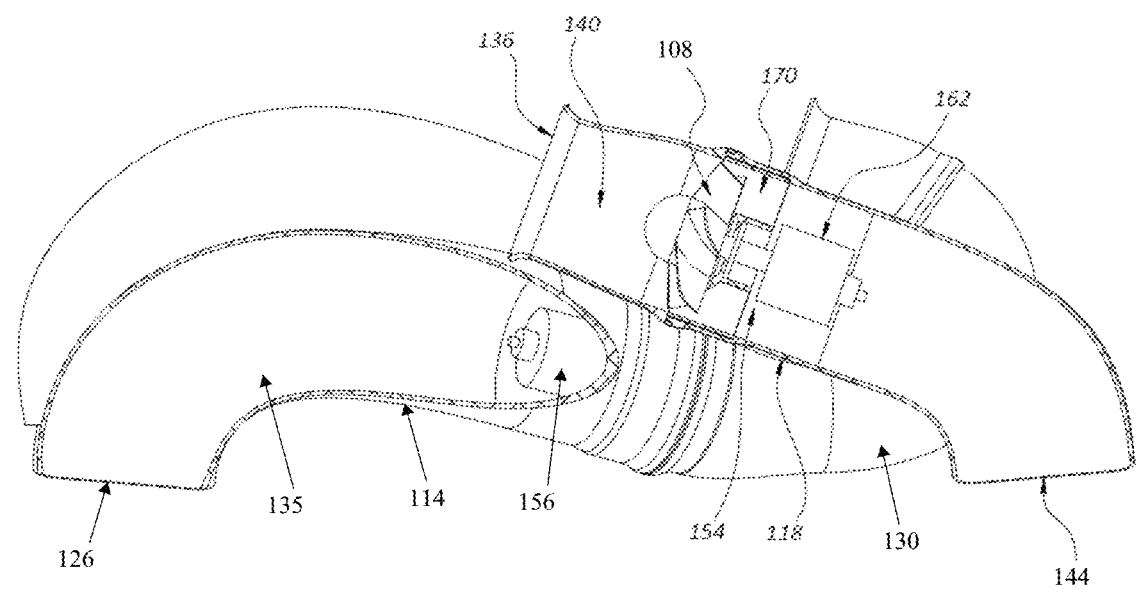
FIG. 7 depicts a partial side section view taken at Section 7-7 in FIG. 3 of the embodiment disclosed in FIG. 1.

FIG. 7 depicts one example of a section view of a front duct system 116 (shown as Section 7-7 in the front view of FIG. 3). In the figure, it can be seen that motor assembly 156 is contained within front ductwork 112 between the front duct inlet 120 and the front duct outlet 126. The motor 156 rotates a ducted fan 104 (which may alternatively be comprised of multiple fans in the duct and be counter-rotating to negate effects of losses due to swirling). Ducted fans may or may not be compounding, e.g. the exit of one fan feeds the inlet of the subsequent fan. Further, it is possible that in different embodiments, each duct pair can draw from a common intake, or completely separate and distinct intakes. For example, intakes 120 and 122 are already shown (See FIG. 1) drawing from common manifold 124. These intakes, however, could be completely independent like the arrangement shown for intakes 136 and 138. Alternatively, the common manifold area could be extended and adapted to contain a single fan assembly arrangement, and then ducts 112 and 114 would later split apart after the fan to release in substantially the same manner as for the disclosed embodiment. Similarly, the separate intakes 136 and 138 could be configured to draw from a common manifold and then, alternatively, utilize a single fan assembly (or maintain separate fan assemblies). Thus, those skilled in the art should not assume any of these arrangements are required unless specifically claimed. The stators 164, 166, 168, and 170 exist in close proximity to each of fans 104, 106, 108, and 110 for the purpose of straightening the airflow exiting the fans to improve efficiency by decreasing losses due to swirling.

Referencing FIG. 7 further, it can be seen that air is drawn in through the duct inlet 136 where it is accelerated by fan 108, and diverted mostly downwards by the rear duct outlet 144 for the purpose of vertical flight. The rear duct inlet 136 may or may not be designed as a plenum for the purpose of containing a larger volume of air for which fan 108 can process. The use of a plenum style duct inlet can increase the thrust output by the fan 108 via the rear duct outlet 144. It should be understood, that in the disclosed embodiment, that a laterally symmetrical arrangement exists for the ducted fan motor assembly arrangements serving duct 118 as exists for the motor and duct arrangements shown inside duct 116. Similarly, the ducted fan and motor arrangements of ducts 112 and 114 are laterally symmetrical. That the ducts are symmetrical on the right and left sides of the craft should not be considered a limitation unless specifically claimed.

Figure 8:
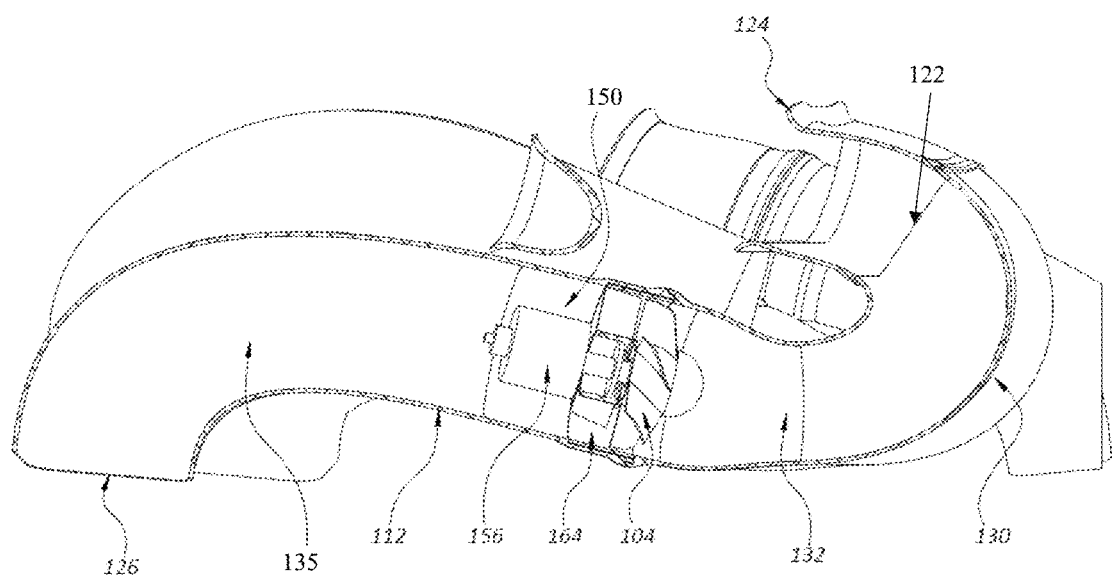
FIG. 8 depicts a partial side section taken at Section 8-8 in FIG. 3 of the embodiment disclosed in FIG. 1.

FIG. 8, taken at Section 8-8 shown in front view FIG. 3, depicts one example of a section view of a duct system 112. Motor assembly 156 is contained within front duct system 112 between the front duct inlet 120 (which receives air from plenum 124) and the front duct outlet 126. Motor 156 rotates a ducted fan 104 which may or may not be counter-rotating to negate effects of losses due to swirling. Ducted fans may or may not be compounding, e.g. the exit of one fan feeds the inlet of the subsequent fan. Stator 164 exists in close proximity to fan 104 for the purpose of straightening the airflow exiting the fan 104 to improve efficiency by decreasing losses due to swirling. It should be recognized that, in the disclosed embodiment, a symmetrical arrangement exists in duct 114 for fan assembly 106.

Thus, still referring to FIG. 8, air is drawn in through duct inlet 120 of duct 112 where it is accelerated by fan 104, and then diverted mostly downwards by the front duct outlet 126 for the purpose of vertical flight. The front duct inlet 120 may or may not include the design where a plenum (e.g., plenum 124) is used. The plenum 124, however, contains (scoops) a larger volume of air for which the plurality of fans (e.g., fans 104 and 106) can process. The use of a plenum style duct inlet can increase the thrust output by the fans 104 and 106 via each of the front duct outlets 126 and 128. Again, a laterally-symmetrical relationship, in the disclosed embodiment, exists between ducts 112 and 114 not only in terms of configuration, but also regarding the inclusion of the fans 104 and 106 and motor arrangements in each duct.

Although the disclosed embodiment is shown as being symmetrical about the center longitudinal axis of the vehicle (substantially laterally symmetrical), in other alternative embodiments, aspects of the disclosed arrangements could be borrowed and incorporated into a non-symmetrical embodiment versions. Also, in alternative embodiments, fewer (e.g., three) ducts might be used in a balanced fashion around the craft to enable VTOL. In other embodiments, more ducts might be used in the VTOL vehicle in a balanced substantially symmetrical or non-symmetrical arrangement. Thus, unless specifically claimed, the use of four duct systems, and/or that the vehicle is symmetrical, should not be considered limiting unless specifically claimed.

Figure 9:
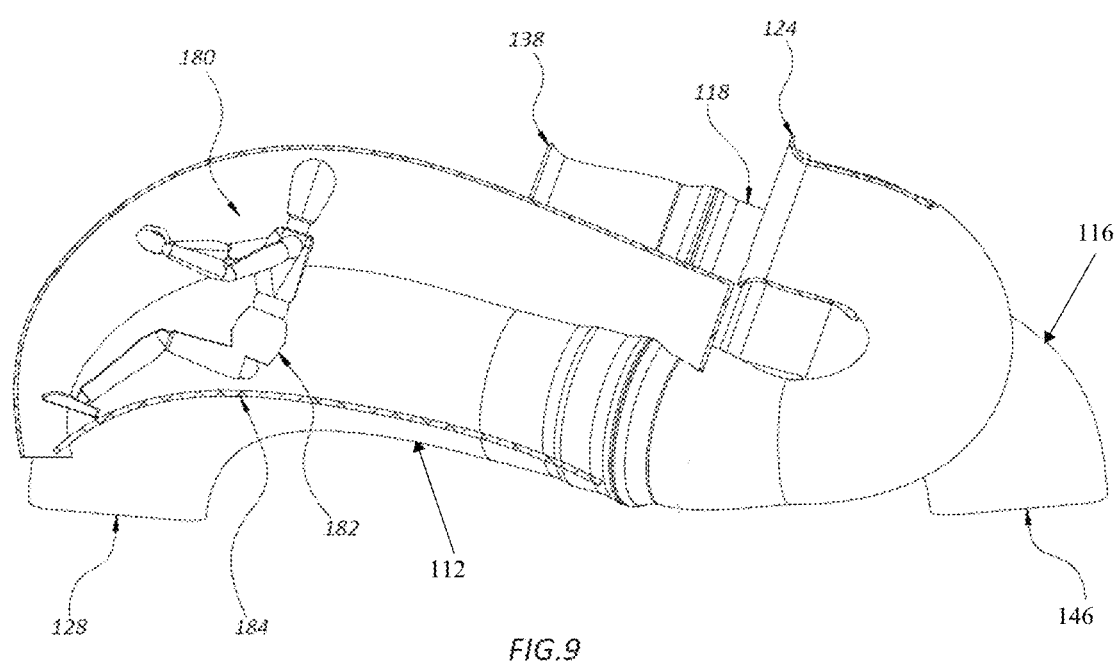

FIG. 9 depicts one example of a section view taken in Section 9-9 in the front view of FIG. 3 (the view is a vertical plane taken along the center longitudinal axis of the craft). In this view, it can be seen that the body 102 of the airframe 100 has been configured to internally define a space which can be utilized as a payload compartment 180. In embodiments, the payload might include one or more passengers 182. Those skilled in the art will recognize that the body 102 would also likely include flight controls in manned embodiments (as well as numerous other flight-related interfaces), as well as passenger seating and other features.

Referencing FIG. 9 further, it can be seen that the duct arrangement is configured such that the bottom, or floor pan 184 of the aerial vehicle is shaped to create lift. In embodiments, the floor pan 184 is shaped in undercambered fashion as it relates to the shape of an airfoil. The front duct systems 112 and 114 are intentionally shaped in a way as to facilitate the undercambered nature of the floor pan 184 (are actually incorporated into the undercambered configuration of the underside of the craft) such that positive pressure is created during forward flight under the aerial vehicle to further aid in creating lift described by Bernoulli's principle.

Figure 10:
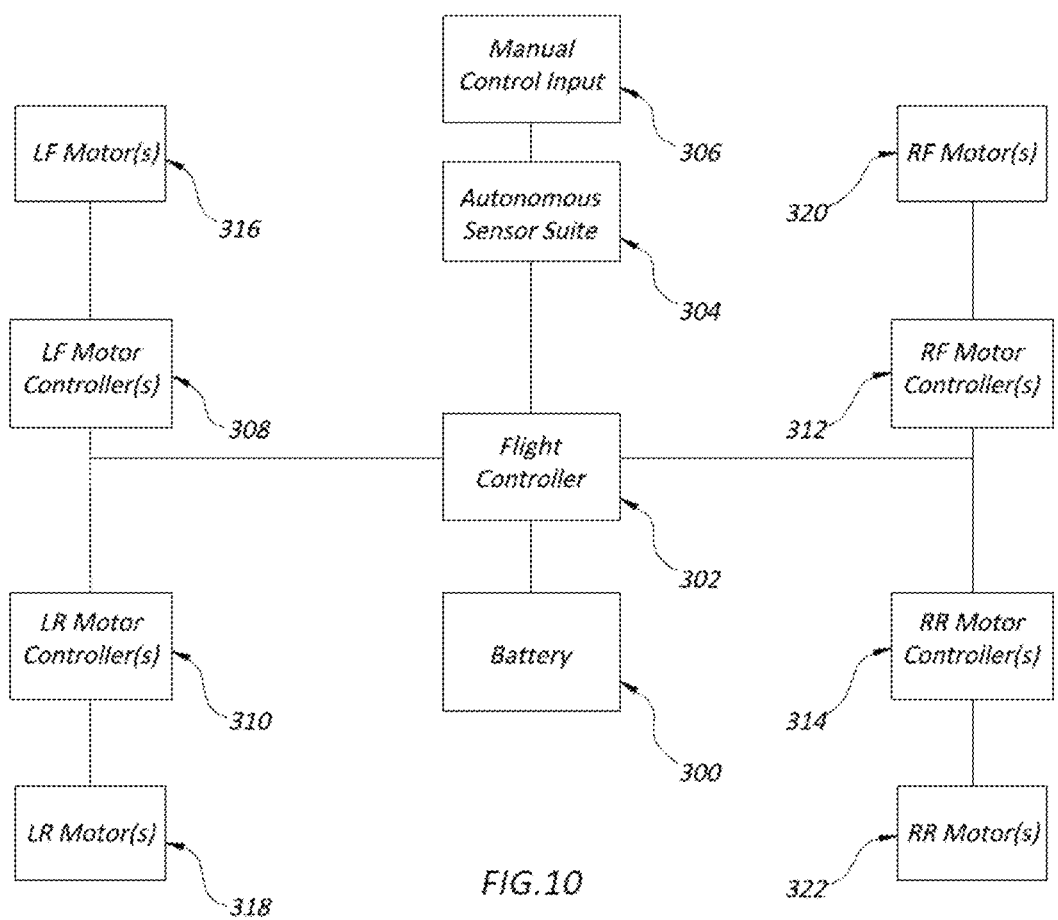
FIG. 10 illustrates an exemplary electronic component architecture which could be utilized in the embodiment disclosed in FIG. 1.

FIG. 10 depicts one example of an electronic system layout comprised of a battery pack 300, electronic flight controller 302, autonomous sensor suite 304, manual control input 306 all located within the airframe body 102, adjacent to the payload compartment 180. There also exist a plurality of left front motor controllers 308, a plurality of left rear motor controllers 310, a plurality of right front motor controllers 312, and a plurality of right rear motor controllers 314. There also exist a plurality of left front motors 316, a plurality of left rear motors 318, a plurality of right front motors 320, and a plurality of right rear motors 322.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An aerial device comprising:
   a body establishing a substantially rectangular footprint and having an undercambered floor;
   a plurality of duct systems incorporated into the body, each duct system including an electrically-powered fan;
   each duct system having an air intake, each of the air intake opening in, and consuming air from a forward direction, each of the duct system expelling air in a downward direction from four distinct positions, each of the four distinct positions being located about the periphery of the body, the aerial device configured such that thrust differentials in each of the ducted fan establish flight control for the aerial device;
   a first, a second, a third, and a fourth duct in the plurality of duct systems;
   each of the first and second ducts being configured to intake air from a front of the aerial device above the body and then being reversed to expel air from a forward portion of the aerial device substantially in the downward direction relative to a horizontal axis and in an outward direction relative to a vertical axis of the aerial device;
   each of the third and fourth ducts being configured to receive air from the front of the aerial device above the body and expel air in the downward direction relative to the horizontal axis and in an outward direction relative to the vertical axis from a substantially rearward portion of the aerial device; and
   wherein at least two of the first, second, third, and fourth ducts are together configured into a lift-creating profile provided underneath the body and at least contributing to the undercambered floor.

2. The aerial device of claim 1 wherein the duct systems expel air from a plurality of fixed-position outlets of the duct systems outwardly relative to the vertical axis, and downwardly relative to the horizontal axis of the aerial device.

3. The aerial device of claim 1 wherein:
the first duct, second duct, third duct, and fourth duct terminate at a first outlet, a second outlet, a third outlet, and a fourth outlet, respectively; and
each of the first, second, third, and fourth outlets are located at a location near a corner of the body of the aerial device, and wherein the first outlet is located on a front left hand side of the aerial device, the second outlet is located at a front right hand side of the aerial device, the third outlet is located at a rear left hand side of the aerial device, and the fourth outlet is located at a rear right hand side of the aerial device.

4. The aerial device of claim 3 wherein a control system on the aerial device is configured to create a roll-inducing thrust output differential between: (i) the first and third outlets; and (ii) the second and fourth outlets.

5. The aerial device of claim 3 wherein a control system on the aerial device is configured to create a pitch-inducing thrust output differential between: (i) the first and second outlets; and (ii) the third and fourth outlets.

6. The aerial device of claim 3 wherein a control system on the aerial device is configured to create a yaw-inducing thrust output differential between: (i) the first and fourth outlets; and (ii) the second and third outlets.

7. The aerial device of claim 1 wherein the body and the first, second, third, and fourth ducts are all configured into the aerial device such that the aerial device has an overall three dimensional volume enabling the aerial device to fit in a parking space established for a size of an automobile.

8. The aerial device of claim 7 wherein the substantially rectangular footprint is substantially the same as an automobile footprint.

9. An aerial device comprising:
a body configured to include a payload and establish an undercambered floor creating lift during flight;
first and second ducted fans included in first and second reversing duct systems, respectively, each of the first and second duct systems being configured to receive air from a substantially forward direction and then expel air in a substantially downward direction;
third and fourth ducted fans included in third and fourth duct systems, each of the third and fourth duct systems being configured to receive air from the substantially forward position and expel air in a substantially downward direction; and
wherein each of the first and second reversing duct systems include:
(i) a substantially-forward-facing intake opening leading a slightly-downwardly angled receiving section, then transitioning into
(ii) a rear elbow section, the rear elbow section redirecting airflow from a substantially rearward direction to a substantially forward direction, the rear elbow section then transitioning into
(iii) a skewed expansion section, the skewed expansion section being expanded and then angled slightly upward, the skewed expansion section then transitioning into
(iv) a continuing expansion section expanding slightly while substantially following the slightly upward direction imposed by the skewed section, the continuing expansion section then transitioning into
(v) a forward elbow section, the forward elbow section redirecting the air from the slightly upward direction imposed by the continuing expansion section, and then directing the air substantially downward and slightly outward from the body of the aerial device.

10. The aerial device of claim 9 wherein each of the third and fourth duct systems include: (i) a substantially-forward facing intake opening leading into a subtle elbow, the subtle elbow accepting air from the intake opening, and directing the air both in a downward direction relative to a horizontal axis and also in an outward direction relative to a vertical axis from the rear of the aerial device.

11. The aerial device of claim 9 wherein each of the first, second, third, and fourth duct systems include intakes located above the body collectively creating a pressure drop above the body when the ducted fans are operational, and the pressure drop creating lift.

12. The aerial device of claim 9 wherein the payload is a human.

13. The aerial device of claim 9 wherein the first and second ducts are substantially symmetrical about a vertical plane taken along the length of the aerial device, and the third and fourth ducts are also substantially symmetrical about the vertical plane taken along the length of the aerial device.

14. An aircraft, comprising:
a body configured to accommodate a human passenger;
first and second ducted fan systems configured to generate thrust using a first electric fan and a second electric fan, respectively, and expel air in a consistently sustained direction relative to a horizontal axis of the aircraft and outwardly relative to a vertical axis of the aircraft from each of a first and a second outlets, respectively;
third and fourth ducted fan systems configured generate thrust using a third ducted fan and a fourth ducted fan, respectively, and expel air from a directionally fixed third outlet and a directionally fixed fourth outlet downwardly relative to the horizontal axis of the aircraft and outwardly relative to the vertical axis of the aircraft from each of a third and a fourth outlet, respectively;
a control system on the aircraft, the control system configured to create:
a roll-inducing thrust output differential between: (i) the first and third electric fans; and (ii) the second and fourth electric fans;
a pitch-inducing thrust output differential between: (i) the first and second electric fans; and (ii) the third and fourth electric fans; and
a yaw-inducing thrust output differential between: (i) the first and fourth electric fans; and (ii) the second and third electric fans; and
wherein at least two of the first, second, third, and fourth ducted fan systems are together configured into an lift-creating profile provided underneath the body of the aircraft, the lift-creating profile at least contributing to establish an undercambered floor of the aircraft.

* * * * *